April 12, 1949.  R. C. MOORE  2,466,959
RADIO RECEIVER NOISE DISCRIMINATING CIRCUIT
Filed Sept. 30, 1944
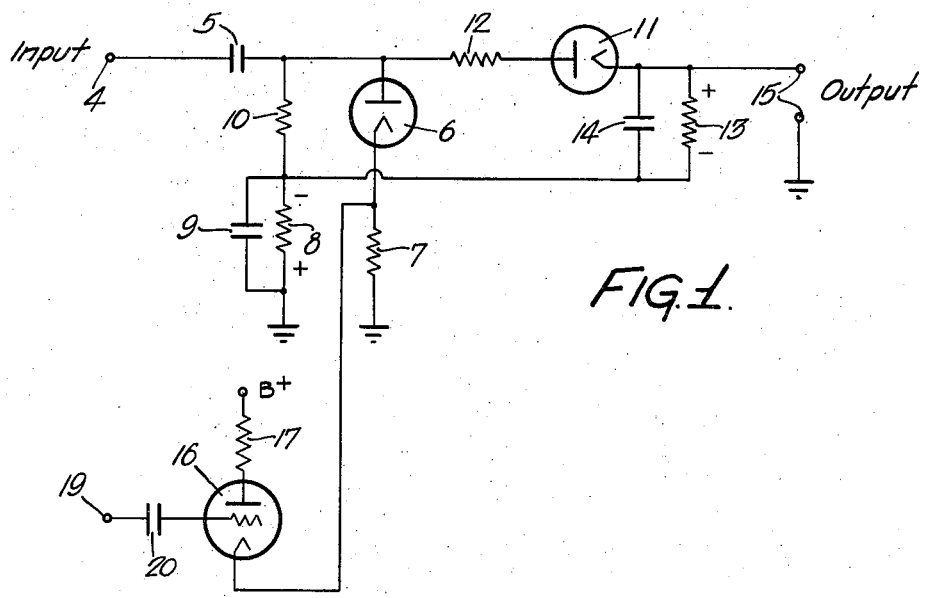
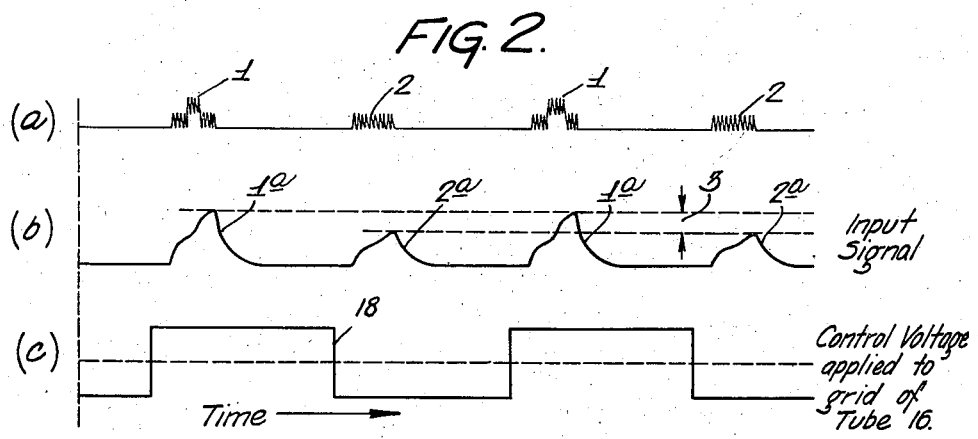
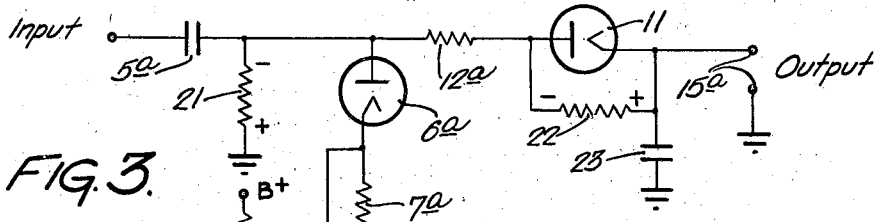
Inventor:
Robert C. Moore
by his Attorneys
Howson & Howson Patented Apr. 12, 1949

2,466,959

UNITED STATES PATENT OFFICE 2,466,959

RADIO RECEIVER NOISE DISCRIMINATING CIRCUIT

Robert C. Moore, Philadelphia, Pa., assignor, by mesne assignments, to Philco Corporation, Philadelphia, Pa., a corporation of Pennsylvania Application September 30, 1944, Serial No. 556,590

3 Claims. (Cl. 250—20)

This invention relates to signalling systems employing time-spaced pulses and more particularly to a novel circuit for the detection of desired signal pulses in the presence of noise pulses.

In certain radio detecting and ranging (radar) systems, the receiver embodies means for producing a D. C. control voltage whose magnitude varies according to the distance or range of the signal-reflecting object or target. Such a system may employ a "gating" means for rendering the receiver receptive to incoming signals at regular intervals. The admitted signals are integrated to produce "bursts" or pulses from which the D. C. control voltage is produced. The desired signals which are received during the receptive periods are usually accompanied by random noise which makes it difficult to detect the signals and to produce the desired D. C. control voltage. To overcome this difficulty the "gating" may be effected at twice the frequency of the desired signal pulses so as to admit noise pulses alone during alternate receptive periods, and such noise pulses may be employed to balance out the D. C. component of the noise accompanying the desired signals. The present invention provides a novel circuit arrangement for performing the latter function.

One object of the invention, therefore, is to provide an efficient means for detecting desired signal pulses and for producing a D. C. voltage whose magnitude is proportional to the amplitude of the signal pulses.

Another object of the invention is to provide a novel circuit arrangement for producing an output voltage which is proportional to the difference in amplitude between different incoming pulses.

A further object of the invention is to provide a circuit ararngement of this character by means of which a pair of D. C. voltages are produced and are combined in opposed relation to obtain a resultant voltage which is proportional to the difference in amplitude between the different input pulses.

Other objects and features of the invention will become apparent from the following detailed description with reference to the accompanying drawing, in which:

Fig. 1 is a schematic diagram of one form of the circuit provided by the invention;

Fig. 2 is an explanatory illustration which will aid in the description of the invention; and Fig. 3 is a schematic diagram of an alternative embodiment of the circuit.

For the purposes of the present description it may be assumed that the receiver, in a system of the above-mentioned character, employs double frequency gating, i. e. the receiver is rendered receptive during predetermined intervals occurring at twice the frequency of the desired pulse signals. As a result of such gating, the receiver produces signals of the character shown at (a) in Fig. 2. Alternate signals 1 comprise both signal and noise, while the other alternate signals 2 comprise noise only. These signals are provided by raising the receiver gain to full sensitivity during successive intervals which are the same in the presence or absence of the desired signals. Such signals are integrated to produce "bursts" or pulses of the character shown at (b). The pulses 1a comprise both signal and noise, while the pulses 2a comprise noise only. Following integration and amplification, the difference in amplitude between the pulses 1a and 2a is represented by the dimension 3 and corresponds to the amplitude of the desired pulses at any instant. By the present invention there is provided a novel circuit arrangement which responds to the different amplitudes of the pulses and which produces a D. C. voltage whose magnitude is proportional to the amplitude difference and hence is proportional to the amplitude of the desired signal pulses.

One form of the novel circuit is shown in Fig. 1 wherein the pulses represented at (b) in Fig. 2 are applied to the input terminal 4. The latter is connected through a coupling condenser 5 to the anode of a diode detector 6. The circuit of said detector includes a cathode resistor 7, a resistance-capacitance load combination 8—9, and a resistor 10, these elements being connected as shown.

A second diode detector 11 has its anode connected to the anode of detector 6, preferably through a resistor 12, the purpose of which will be described hereinafter. The cathode of diode 11 is connected to a resistance-capacitance load combination 13—14 which, in turn, is connected to the ungrounded end of the load resistor 8. The D. C. output is derived from across the load resistors 8 and 13 in series and appears at the output terminals 15.

A control tube 16, which may take the form of a triode, has its cathode connected to the ungrounded end of the cathode resistor 7. The plate or anode of tube 16 is connected to a suitable source of voltage supply through a plate load resistor 17. A control voltage 18, as shown at (c) in Fig. 2, is applied to terminal 19 and is thus applied to the control grid of tube 16 through coupling condenser 20. The purpose of this will be understood presently.

Considering the operation of the circuit shown in Fig. 1, the diode 6 is caused to operate as a peak detector for the lower amplitude noise pulses only. This result is achieved by raising the cathode potential of diode 6 sufficiently to render it inoperative or non-responsive during the occurrence of the pulses 1a (Fig. 2). Such is the purpose of the "blanking" voltage 18 which is applied to the control grid of tube 16 as above mentioned. It will be seen from Fig. 2 that the control grid of tube 16 is driven negative during the occurrence of the noise pulses 2a, which reduces the voltage across resistor 7 sufficiently to permit the diode 6 to detect the said pulses and produce a D. C. voltage across its load resistor 8 of the polarity indicated. Preferably the amplitude of the blanking voltage wave 18 is sufficient to cut off the plate current of tube 16 during each negative half cycle of said wave. Just prior to the occurrence of the pulses 1a, however, the grid of tube 16 is driven positive sufficiently to render the diode 6 non-responsive to such pulses, by reason of the voltage across resistor 7. The second diode 11 operates as a peak detector for the pulses 1a, and produces a D. C. voltage across its load resistor 13 of the polarity indicated. It will be noted that the voltages across resistors 8 and 13 have opposite polarities and therefore the resultant output voltage is determined by the difference between the two opposed voltages. By providing suitable time constants for the R–C load circuits of the two detectors, the desired D. C. output voltage may be readily obtained.

The purpose of the resistor 12 is to provide in the circuit of diode 11 an impedance equal to that of the cathode resistor 7 and thus provide a better balance between the detector circuits. Accordingly, the value of resistor 12 is substantially equal to that of resistor 7.

The blanking wave 18 may be generated in any suitable manner. For example, it may be generated by a multivibrator controlled by the pulse source which initiates the signal transmission and also opens the receiver "gate."

By way of example, in a specific embodiment according to Fig. 1, the repetition rate or frequency of occurrence of the desired signals was 2 k. c. and the values of the various elements were as follows:

Condenser 5, .1 microfarad
Resistor 7, 1000 ohms
Resistor 8, 1 megohm
Condenser 9, .1 microfarad
Resistor 10, 100,000 ohms
Resistor 12, 1000 ohms
Resistor 13, 1 megohm
Condenser 14, .1 microfarad In Fig. 3 there is shown a simplified embodiment of the circuit which accomplishes substantially the same result as does the embodiment of Fig. 1. In this instance the first diode detector 6a has load resistor 21, across which a D. C. voltage appears having the polarity indicated.

The second diode detector 11a has a load resistor 22 connected in shunt relation with the diode and an associated condenser 23 connected between the diode cathode and ground. A D. C. voltage appears across resistor 22 and has the polarity indicated. The output voltage appearing across the output terminals 15a is the resultant of the opposed voltages across resistors 21 and 22. Aside from the changes noted, the circuit of Fig. 3 is the same as that of Fig. 1 and operates in a similar manner.

While the invention has been described with reference to certain embodiments, it is not limited to the circuit arrangements shown nor to the particular values of the elements set forth above. It will be apparent to those skilled in the art that other embodiments of the invention are readily possible within the scope of the appended claims.

I claim:

1. A signal receiving system comprising: a source of spaced pulse signals, providing desired pulse signals and undesired noise energy during at least part of the time between the desired pulse signals, said desired pulse signals including noise components of the same order of intensity as the noise energy between the said pulses; a first peak detector circuit, including a diode and a load circuit consisting of at least two portions, one of which includes energy storage means, connected to said source, for providing a unidirectional voltage comparable in intensity with the peak value of said undesired noise energy, and for storing said voltage in said energy storage portion of said load circuit; means for rendering said diode detector inoperative synchronously with the occurrence of said desired signal pulses; a second peak detector diode circuit connected to a second portion of said load circuit and including a second load circuit for providing a second unidirectional voltage comparable in intensity with the peak value of said desired signals including noise components; output connections for said system; and connections connecting said load circuits in opposed relation with respect to the said unidirectional voltages present therein, for transmitting the remaining desired signal to the said output connections.

2. The signal-receiving system of claim 1 wherein a portion of the load circuit of the first peak detector circuit is a pure resistance and a portion of the load circuit of the second peak detector circuit is a pure resistance, said resistances being of the same magnitude.

3. In a system for producing an output voltage which is proportional to the difference in amplitude between two incoming intermittent alternately-occurring pulse signals of different amplitudes, a series-connected diode and an associated resistance-capacitance load circuit for selectively detecting the pulses of greater amplitude and for producing across said load circuit a unidirectional voltage whose amplitude is determined by the amplitude of those pulses, a shunt-connected diode and an associated resistance-capacitance load circuit for detecting the peaks of the pulses of lower amplitude and for producing across the latter load circuit a unidirectional voltage whose amplitude is determined by the amplitude of the latter pulses, means for rendering said last-mentioned diode inoperative during the occurrence of the pulses of greater amplitude, means for connecting said load circuits in series-opposing relation with respect to said voltages, and means for deriving the resultant voltage from the interconnected load circuits.

ROBERT C. MOORE.

REFERENCES CITED

The following references are of record in the file of this patent:

UNITED STATES PATENTS

| Number | Name | Date |
|---|---|---|
| 1,616,923 | Ranger | Feb. 8, 1927 |
| 1,635,156 | Clement | July 5, 1927 |
| 1,929,086 | Thompson | Oct. 3, 1933 |
| 2,059,081 | Beers | Oct. 27, 1936 |
| 2,113,212 | Landon | Apr. 5, 1938 |
| 2,146,068 | Haffcke | Feb. 7, 1939 |
| 2,180,355 | Haffcke | Nov. 21, 1939 |
| 2,199,634 | Koch | May 7, 1940 |
| 2,225,524 | Percival | Dec. 17, 1940 |
| 2,227,057 | Blumlein | Dec. 31, 1940 |
| 2,227,415 | Wolff | Dec. 31, 1940 |
| 2,344,697 | Hollingsworth | Mar. 21, 1944 |
| 2,406,841 | Levy | Sept. 3, 1946 |